(12) United States Patent
Rothschild

(10) Patent No.: US 9,740,784 B2
(45) Date of Patent: *Aug. 22, 2017

(54) SYSTEM AND METHOD FOR PRESENTING INFORMATION ABOUT AN OBJECT ON A PORTABLE ELECTRONIC DEVICE

(71) Applicant: SYMBOLOGY INNOVATIONS, LLC, Plano, TX (US)

(72) Inventor: Leigh M. Rothschild, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,309

(22) Filed: Jan. 18, 2017

(65) Prior Publication Data

US 2017/0124195 A1     May 4, 2017

Related U.S. Application Data

(63) Continuation of application No. 15/149,852, filed on May 9, 2016, now Pat. No. 9,582,689, which is a
(Continued)

(51) Int. Cl.
*G06K 7/10* (2006.01)
*G06F 17/30* (2006.01)
(Continued)

(52) U.S. Cl.
CPC .. *G06F 17/30864* (2013.01); *G06F 17/30899* (2013.01); *G06K 7/10722* (2013.01);
(Continued)

(58) Field of Classification Search
USPC .............. 235/375, 379; 705/39, 41.1, 80
See application file for complete search history.

(56) References Cited

U.S. PATENT DOCUMENTS 6,430,554 B1   8/2002 Rothschild
6,651,053 B1   11/2003 Rothschild
(Continued)

OTHER PUBLICATIONS

U.S. Appl. No. 60/118,051, Leigh M Rothschild, filed Feb. 1, 1999.
(Continued)

*Primary Examiner* — Allyson Trail
(74) *Attorney, Agent, or Firm* — Eugenio J. Torres-Oyola; Victor Rodriguez-Reyes; Rafael Rodriguez-Muriel

(57) ABSTRACT

Systems and methods are provided for enabling a portable electronic device to retrieve information about an object when the object's symbology, e.g., a barcode, is detected. According to one embodiment a method is providing in which symbology associated with an object is detected and decoded to obtain a decode string. The decode string is sent to one or more visual detection applications for processing, wherein the one or more visual detection applications reside on the portable electronic device, and receiving a first amount of information about the object from the one or more visual detection applications. The method also includes sending the decode string to a remote server for processing and receiving a second amount of information about the object from the remote server. The first amount of information is combined with the second amount of information to obtain cumulative information which is displayed on the portable electronic device.

7 Claims, 8 Drawing Sheets

Related U.S. Application Data continuation of application No. 14/599,704, filed on Jan. 19, 2015, now Pat. No. 9,378,398, which is a continuation of application No. 14/181,945, filed on Feb. 17, 2014, now Pat. No. 8,936,190, which is a continuation of application No. 13/868,071, filed on Apr. 22, 2013, now Pat. No. 8,651,369, which is a continuation of application No. 13/170,810, filed on Jun. 28, 2011, now Pat. No. 8,424,752, which is a continuation of application No. 12/882,616, filed on Sep. 15, 2010, now Pat. No. 7,992,773.

(51) Int. Cl.
    *G06K 19/06*        (2006.01)
    *G06K 7/14*         (2006.01)

(52) U.S. Cl.
    CPC ....... *G06K 7/10881* (2013.01); *G06K 7/1413* (2013.01); *G06K 19/06028* (2013.01)

(56) References Cited

U.S. PATENT DOCUMENTS

| | | | |
|---|---|---|---|
| 2007/0216226 A1* | 9/2007 | Matsumoto | B60L 3/04 307/10.1 |
| 2007/0291534 A1* | 12/2007 | Maatta | H04M 1/0237 365/174 |
| 2008/0004978 A1 | 1/2008 | Rothschild | |
| 2008/0201310 A1* | 8/2008 | Fitzpatrick | G06F 17/30867 |
| 2009/0099961 A1* | 4/2009 | Ogilvy | G06Q 20/10 705/39 |
| 2010/0280896 A1* | 11/2010 | Postrel | G06Q 30/02 705/14.29 |
| 2010/0280960 A1* | 11/2010 | Ziotopoulos | G06Q 20/202 705/80 |

OTHER PUBLICATIONS

U.S. Appl. No. 60/187,646, Leigh M Rothschild, filed Mar. 8, 2000.
U.S. Appl. No. 60/185,546, Leigh M Rothschild, filed Feb. 28, 2000.

\* cited by examiner

US 9,740,784 B2

SYSTEM AND METHOD FOR PRESENTING INFORMATION ABOUT AN OBJECT ON A PORTABLE ELECTRONIC DEVICE

CROSS-REFERENCE TO RELATED APPLICATIONS

The present application is a continuation patent application and claims priority under the laws and rules of the United States, including 35 USC §120, to U.S. patent application Ser. No. 15/149,852 filed on May 9, 2016, which is a continuation patent application of U.S. patent application Ser. No. 14/599,704, filed on Jan. 19, 2015, which is a continuation patent application of U.S. patent application Ser. No. 14/181,945 filed on Feb. 17, 2014, now U.S. Pat. No. 8,936,190, which is a continuation patent application of U.S. patent application Ser. No. 13/868,071 filed on Apr. 22, 2013, now U.S. Pat. No. 8,651,369, which is a continuation patent application and claims priority under the laws and rules of the United States, including 35 USC §120, to U.S. patent application Ser. No. 13/170,810 filed on Jun. 28, 2011 now U.S. Pat. No. 8,424,752 issued on Apr. 23, 2013 which is a continuation patent application and claims priority under the laws and rules of the United States, including 35 USC §120, to U.S. patent application Ser. No. 12/882,616 filed on Sep. 15, 2010 now U.S. Pat. No. 7,992,773 issued on Aug. 9, 2011. The contents of U.S. application Ser. No. 15/149,852, U.S. application Ser. No. 14/599,704, U.S. patent application Ser. No. 14/181,945, now U.S. Pat. No. 8,936,190, U.S. patent application Ser. No. 13/868,071, now U.S. Pat. No. 8,651,369, U.S. patent application Ser. No. 13/170,810, U.S. Pat. No. 8,424,752, U.S. patent application Ser. No. 12/882,616 and U.S. Pat. No. 7,992,773 are herein incorporated by reference in their entireties.

BACKGROUND

1. Field

The present disclosure relates generally to portable electronic devices, and more particularly, to systems and methods for enabling portable electronic devices to present information about a selected object.

2. Description of the Related Art

It is increasingly common for individuals to own and carry portable electronic devices, such as mobile phones, personal digital assistants (PDAs), etc. Many of these devices are capable of providing fully functional computer processing incorporating cellular communication and network data communication. Examples include various Windows™ Pocket PC devices, which have an operating system created by Microsoft Corporation of Redmond, Wash. Other examples include various mobile phone devices, some of which have built-in cameras, scanning devices, and other types of imaging devices. Still other portable digital devices include portable media players from Creative Media of Singapore, Samsung of South Korea, Archos, Inc. of Irvine, Calif., and Apple Computers, Inc. of Cupertino, Calif. Additionally, Sony of New York and Japan manufacture a portable game playing device called the Sony PSP™ (PlayStation Portable).

Increasingly, many of these portable electronic devices include means of transmitting and receiving digital data. Various communications technologies are frequently built into these devices. Examples of portable communicating devices include mobile phones which employ GSM, CDMA, W-CDMA, and FOMA technology, among other standards, to send and receive data in addition to handling voice communications. Many of the portable media devices also include transmission capabilities including Wi-Fi (IEEE 802.11a, b, g and x among others), Bluetooth™, infrared, etc. to allow the user to transmit and receive digital data over relatively short distances. The Sony PSP™ device, for example, includes Wi-Fi (i.e., IEEE 802.11b) to transmit and receive digital data.

Many portable electronic devices are configured to contain various applications, which may be installed during manufacture and/or may be downloaded by the user. Examples of these applications include e-commerce applications, word processing, movie theater locating applications, games, e-mail programs, GPS navigation software, medical information, weather applications, etc. Examples of the portable electronic devices that contain both applications and imaging systems include Apple Computer's IPhone, Google's Droid, and various mobile devices from Motorola.

SUMMARY

In keeping with one aspect of this invention, an object is scanned using an electronic device. The object contains a Radio Frequency Identification Tag (RFID). Symbology associated with the object is detected using the electronic device, and the symbology is decoded to obtain a decode string using one or more detection applications residing on the electronic device. The decode string is sent to a remote server for processing. Information about the object is received from the remote server based on the decode string. The information is displayed on a display device associated with the electronic device.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
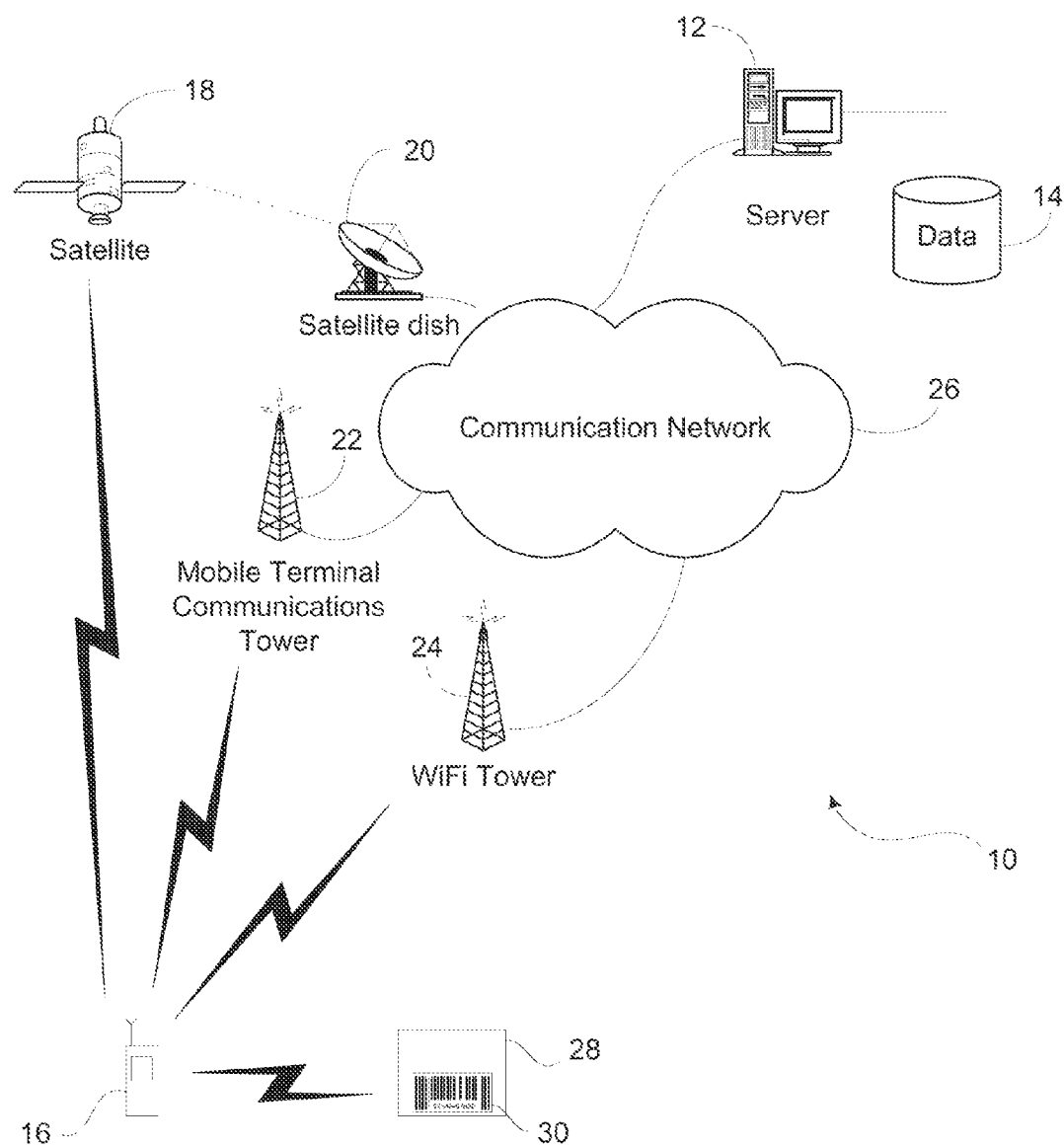
FIG. 1 is a diagram of a system enabling communication among a number of components.

Preferred embodiments of the present disclosure will be described hereinbelow with reference to the accompanying drawings. In the following description, well-known functions or constructions are not described in detail to avoid obscuring the present disclosure in unnecessary detail.

Systems and methods are provided for enabling portable electronic devices to gather information about a selected object and present the information on a display device. Using any applicable visual detection device (e.g., a camera, scanner, or other device) on the portable electronic device, the user may select an object by scanning or capturing an image of symbology (e.g., barcodes) associated with the object. The object may be an article of commerce, product, service, or any item associated with various types of symbology.

Many types of detection systems are available to enable a user to select an object. One such system may be an image capture device containing a charge couple device (CCD) or camera, where the user may scan or take a picture of symbology (e.g., a barcode) placed on or associated with an object. Portable devices (e.g., IPhone from Apple, Android from HTC, etc.) may include decoding software to be used to decode the scanned barcode symbology. In a further embodiment, the object may contain Radio Frequency Identification (RFID) tags used to identify the object to a reader device. Furthermore, if the portable electronic device contains an image capture device (e.g., a camera) and character recognition software, the user may take a picture of the object and the character recognition software may be used to decode the image and/or name of the object.

When symbology has been detected according to the embodiments of the present disclosure, the portable electronic devices are configured to send the symbology information to the appropriate applications residing on the portable electronic device. These applications are instructed to decode the symbology, if not already decoded by other applications on the portable electronic device. The decode string representing the decoded symbology may be used to determine the object associated with the symbology and then gather information about that object. Furthermore, the decode string is sent to a server that is configured to decode symbology (if necessary), identify one or more objects associated with the symbology, retrieve information about the one or more objects, and send the information to the portable electronic device. The portable electronic device may then combine the information from the different sources and display the information to the user.

Some applications that may be downloaded to portable electronic devices include symbology scanning and/or decoding programs. Examples of applications that allow scanning include Neomedia's Neo Reader, Microsoft's Smart Tags, Android's Shop Savvy, Red Laser, ScanBuy, etc. However, when a user wishes to scan an object, the user must then select an application on the portable electronic device that is capable of accomplishing the desired functions. Since a user may have dozens of applications loaded on his or her portable electronic device, it may be difficult to select the appropriate application for executing the scanning functions. The present disclosure provides for the automatic selection of scanning application upon recognition of applicable symbology. The embodiments of the present disclosure also allows for the selection of the best application or applications for scanning a particular symbology when multiple scanning applications reside on the device. In some embodiments, the symbology managing application may be configured to recognize decodable symbology when the user is using the portable electronic device for a simple image capture process. In this sense, the device may allow the user to select whether or not the symbology is to be decoded.

According to various embodiments of the present disclosure, various portable devices already owned by many customers can be enhanced with software applications to enable information retrieval procedures as described in the present disclosure. The portable electronic device may use any suitable communications protocols including but not limited to WiFi (a, b, c d, n, x), cellular communications such as GSM, CDMA, FOMA, etc., infrared communications, cabled communications, Bluetooth communications, satellite communications, etc.

FIG. 1 is a diagram illustrating an embodiment of a communication system 10 in accordance with various implementations of the present disclosure. The communication system 10 in this embodiment includes a server 12, a storage medium 14, a portable electronic device 16, one or more satellites 18, one or more satellite dishes 20, one or more mobile terminal communications towers 22, one or more Wi-Fi towers 24, each of which may be configured to transmit and/or receive signals to the other elements of the communication system 10 via a communication network 26. For example, the portable electronic device 16 may be configured to communicate with the server 12 via the communication network 26 to transfer cellular voice signals, data signals, or other types of signals.

The portable electronic device 16 and server 12 may be connected to the communication network 26 (e.g., the Internet) by any suitable means, such as, for example, hardwired and/or wireless connections, such as dial-up, hardwired, cable, DSL, satellite, cellular, PCS, wireless transmission (e.g., 802.11a/b/g), etc. It is to be appreciated that the communication network 26 may be a local area network (LAN), wide area network (WAN), the Internet, or any other type of network that couples a plurality of computers to enable various modes of communication via network messages. Furthermore, the server 12 may communicate using various protocols, such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server 12 may access the storage medium 14, which is configured to store a database containing information about a number of objects, such as tables identifying objects by their respective decoded symbology, information about the specifications, cost, features, and other details about the objects, and other information and data.

According to some embodiments, the objects of interest may refer to products and/or services sold at various stores. As will be appreciated from the description below, a unique identification code is associated with each product and/or service and may take many forms, such as a barcode number, a UPC number, an alphanumeric number assigned to the product, a name of the article (e.g., "Batman Begins DVD"), etc. The identification codes may be attached to or printed on the products or in some other way associated with the products. According to other embodiments, the products or items may refer to any type of object for which the user wishes to receive information, identifiable by a unique identification code.

The user may utilize the portable electronic device 16 to obtain a visual representation of an object 28 or portion of the object 28. For example, if the object 28 includes a barcode 30, the portable electronic device 16 may be configured to scan the barcode 30 and decode the barcode to acquire an identification code of the object. In some embodiments, the portable electronic device 16 may be configured to capture an image of the barcode 30 and decode the barcode to acquire the associated identification code of the object. Using standard and existing computer processing power and software solutions such as Attrasoft Image recognition software, or optical character recognition software (OCR software such as OmniPage or ReadIris), the image or name of the object may be decoded to determine the identity of the object.

In another embodiment, the user may enter an identification code of the object or the name of the object via a user interface, if the portable electronic device 16 contains a user interface allowing user keyboard input. In some implementations, the user may speak the name of the product into the portable electronic device 16 using a microphone and the audio signals may in turn be processed into digital form via speech recognition software.

In a further embodiment, some objects may contain Radio Frequency Identification (RFID) tags. The portable digital device 16 may contain an RFID reader to resolve the identity of the product. In another embodiment, the name or identification code of an object may be broadcast via the Wi-Fi tower 24 over a predetermined range. Furthermore, the name or identification code of an object may be broadcast from another portable electronic device (e.g., a gaming device, mobile phone, etc.). Here, a user may approach the other portable electronic device having an application stored in memory or currently being used. The other portable electronic device may be configured to automatically broadcast the identification code of the object (i.e., application) or the user of the other portable electronic device may initiate a transfer of the identification code, e.g., via an infrared port or other wireless port, to the first user.

The portable electronic device 16 may use the resources with the device itself to obtain information about the identity of the object and other details of the object. Also, once the product is identified, the portable electronic device 16 may use communications protocols including but not limited to Wi-Fi (a, b, c d, n, x), mobile phone communications such as GSM, CDMA, FOMA, etc., infrared communications, cabled communications, Bluetooth communications, satellite communications, to transmit the identification code to the server 12 on the global computer network (GCN), e.g., the Internet. It is to be appreciated that the portable electronic device 16 may use any one or a combination of protocols to transmit the identification code to the server 12. For example, the portable electronic device 16 may employ a telecommunication protocol to transmit the identification code via the communication module 26. In another embodiment, the portable electronic device 16 may communicate to the server 12 via the same Wi-Fi tower 24 that broadcasts a list of objects for which information is available, e.g., a hot spot in a retail location.

The server 12 may be maintained by a vendor associated with the object. For example, in the case of seeking information about a Warner Brothers™ DVD movie, the server 12 may be a Warner Brothers server connected to a Warner Brothers website. However, the server 12 may also be a vendor not associated or even competing with the object. For example, if the product is a Warner Brothers™ DVD movie, the server 12 may be an e-commerce site such as Amazon.com that offers DVD movies from many companies including Warner Brothers.

Figure 2A:
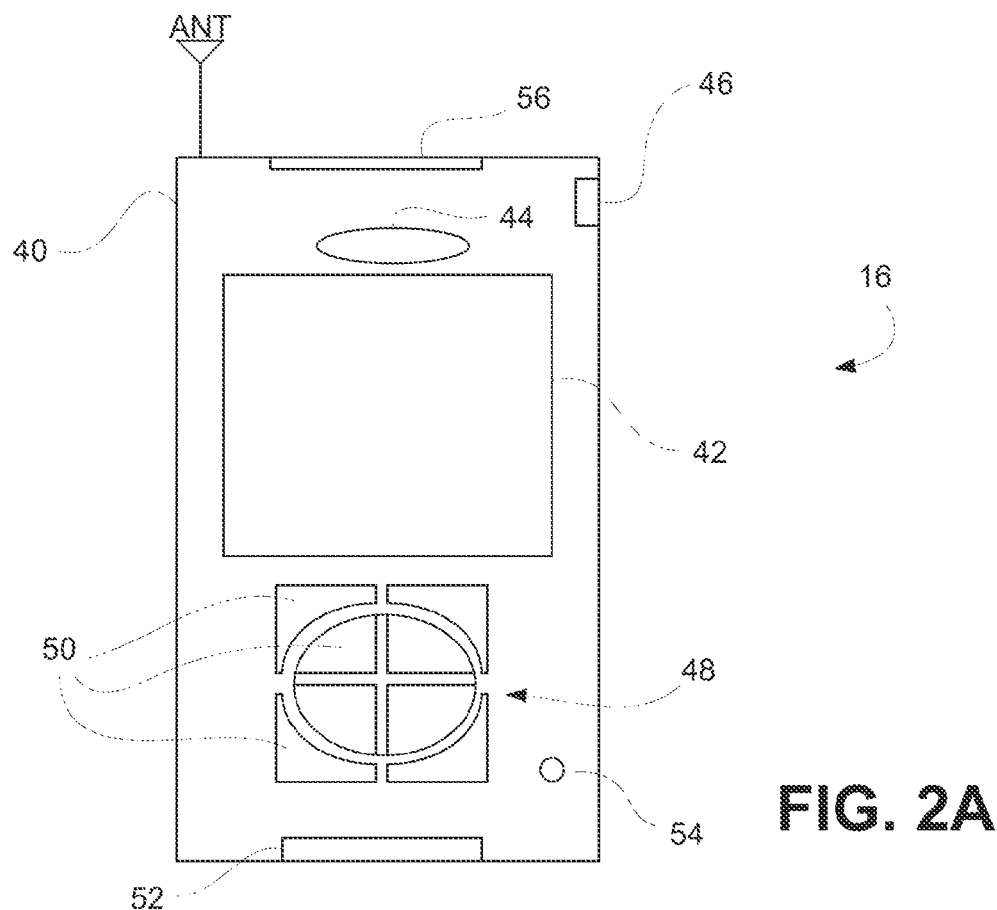
FIG. 2A is a front view of the portable electronic device illustrated in FIG. 1, according to various embodiments of the present disclosure.
Figure 2B:
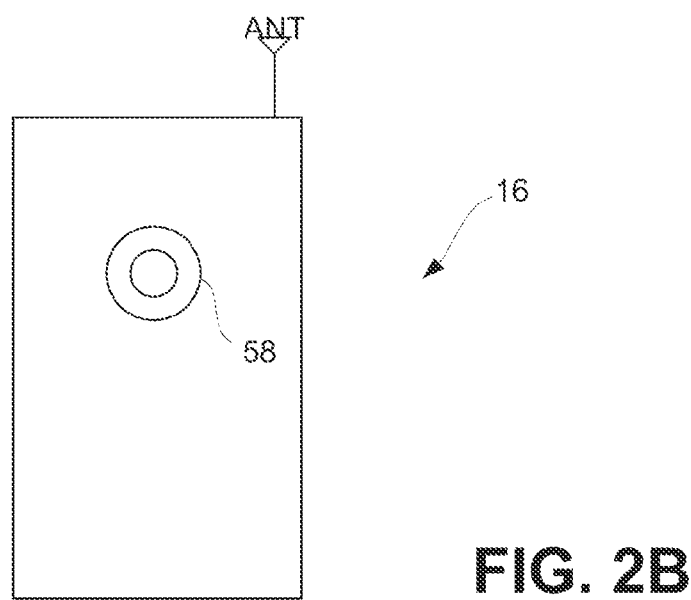
FIG. 2B is a rear view of the portable electronic device of FIG. 2A.

FIG. 2A shows an embodiment of the portable electronic device 16 shown in FIG. 1. According to various implementations, the portable electronic device 16 may be configured to transmit and receive wireless communication signals. As illustrated in this embodiment, the portable electronic device 16 includes various electrical components disposed within a generally rectangular housing 40. A display device 42 is provided for displaying text, images, video, and other visual content, such as movies, animation, etc. A speaker 44 is provided for producing audio (e.g., voice, music, soundtracks associated with a video, or other types of audio content). An audio port 46 may be configured to receive a plug or connector from a headphone, speaker system, stereo system, etc., to stream the audio to an external device. It is to be appreciated that when the external device is connected to the audio port 46, the speaker 44 may be disabled. Input means 48 may include a plurality of buttons 50 for inputting data and navigating through a plurality of menus. A touch screen overlaid upon the display device 42 may also be coupled to the input module for facilitating user input. The portable electronic device 16 further includes a memory port 52 for storing a plurality of content and a transmission system (not shown) for transmitting/receiving data and/or content to another device, e.g., a personal computer, a personal digital assistant (PDA), a server residing on the Internet, etc. Optionally, the portable electronic device 16 may include a microphone 54 for acquiring audio from the user of the device to input data. In some embodiments, the portable electronic device 16 may include a scanning device 56. An image capture device 58 may be located on a back side of the portable electronic device 16 as shown in FIG. 2B.

Figure 3:
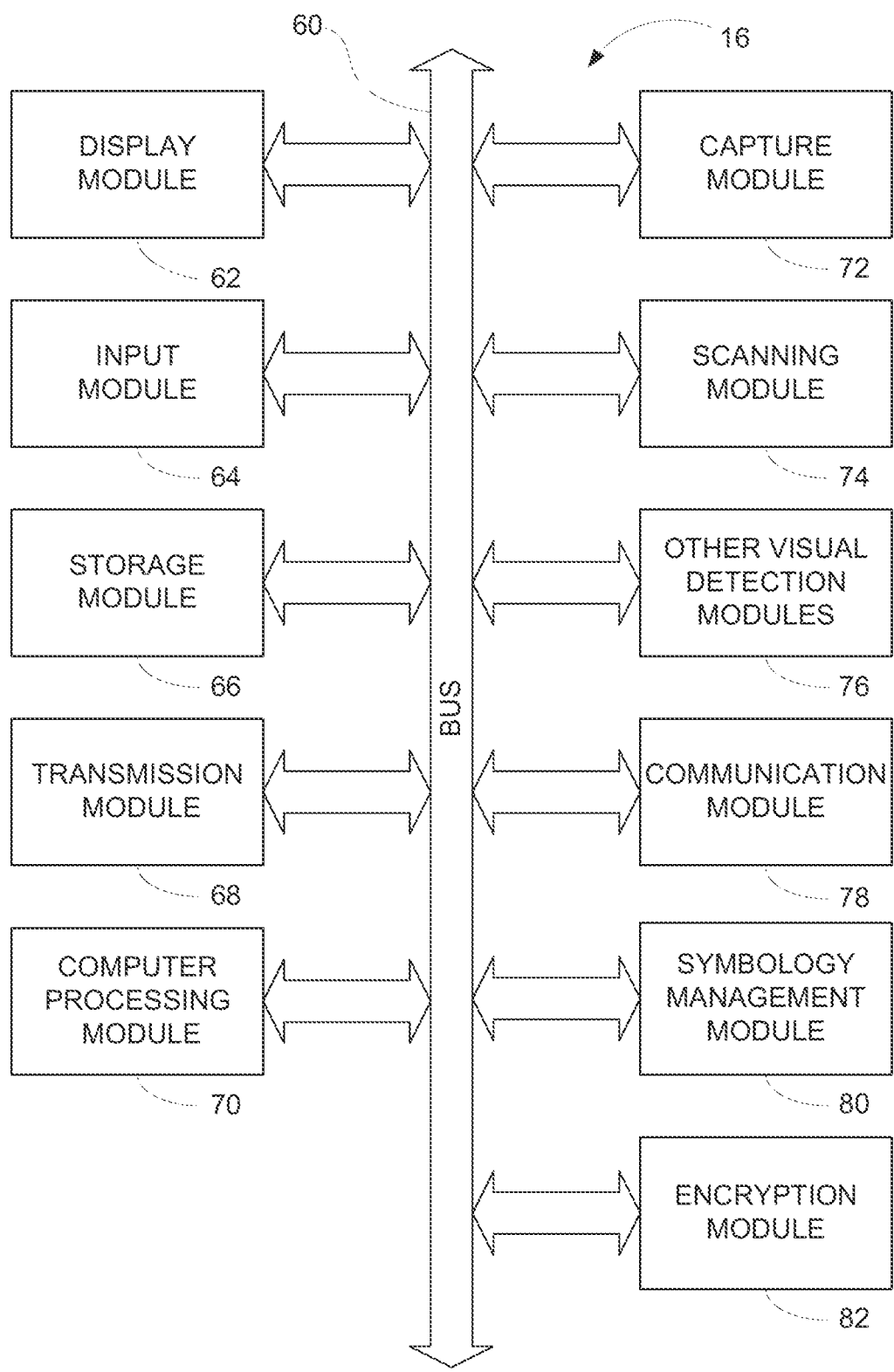
FIG. 3 is a block diagram of various modules included in the portable electronic device illustrated in FIGS. 1, 2A, and 2B, according to various embodiments of the present disclosure.

Referring to FIG. 3, various components of the portable electronic device 16 of FIG. 2 are described. In FIG. 3, the portable electronic device 16 contains a bus 60 that interconnects a display module 62 (related to the display device 42), an input module 64 (related to input means 48), a storage module 66 (related to memory port 52), a transmission module 68, a computer processing module 70, a capture module 72 (related to image capture device 58), a scanning module 74 (related to scanning device 56), other visual detection modules 76, a communication module 78, a symbology management module 80, and an encryption module 82.

The computer processing module 70 (e.g., a microprocessor) may use computer software instructions and conventional computer processing power to interact and organize the traffic flow between the various other modules. It is to be understood that the present disclosure may be implemented in various forms of hardware, software, firmware, special purpose processors, or a combination thereof. The bus 60 couples the various components shown in FIG. 3 and may be any of several types of bus structures (e.g., a memory bus, memory controller, a peripheral bus, a local bus, etc.) using any of a variety of bus architectures. The portable electronic device 16 also includes an operating system and micro instruction code preferably residing in read only memory (ROM) of the storage module 66. The various processes and functions described herein may either be part of the micro instruction code or part of an application program (or a combination thereof) which is executed via the operating system. Exemplary operating systems include but are not limited to SymbianOS, Windows Mobile/Windows CE, Palm OS, Linux, Blackberry OS, BREW, etc., which have been developed for mobile computing applications and can handle both data computing and communication applications, e.g., voice communications.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer processing module 70 may further include, in addition to a microprocessor, a digital signal processor (DSP) for decoding stored audio, video and photo files to be played on the portable electronic device 16. As is known in the art, the DSP may include several known decompression algorithms for decompressing stored media content, e.g., a MP3 file. The device 16 of the present disclosure is configured to support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .mlv, .mp2v .mpeg2), Microsoft Recorded TV Show files (.dvr-ms), Microsoft Windows Video files (.avi) and Microsoft Windows Audio files (.wav).

The display module 62 is configured to display digital information such as video files, image files, text files, etc. The display module 62 (and any corresponding display devices) may be configured in any suitable form, including, for example, Liquid Crystal Displays (LCD), Light emitting diode displays (LED), Cathode Ray Tube Displays (CRT) or any other type of display currently existing or existing in the future. The display module 62 may also include an audio output device, e.g., speaker 44, audio port 46, etc., allowing the user to also hear audio output, e.g., audio associated with a video, a MP3 file, etc.

The input module 64 is configured to either receive user instructions via text input by the way of buttons 50, a standard keyboard interface coupled to the portable electronic device 16, or a character recognition capture device which translates user text input into alphanumeric characters. Preferably, the character recognition device may be a touch screen which overlays the display device 42 and text may be entered via a pen-like stylus. Such input devices are standard and currently available on many electronic devices including portable digital assistants (PDAs) and cellular telephones. Optionally, microphone 54 may be further coupled to the input module 64 for capturing any audio information spoken by the user and the input module 64 may further include an analog-to-digital (A/D) converter for converting the spoken audio information into a digital format. Furthermore, the input module 64 may include a voice recognition processor that translates the digital human voice into alpha numeric characters for user input. The user may utilize the input module 64 to enter data, for example, to request information about merchandise, initiate a purchasing application, etc.

The storage module 66 includes internal storage memory (e.g., random access memory (RAM)) or removable memory (e.g., magnetic storage memory), optical storage memory (e.g., various types of CD and DVD media), solid-state storage memory (e.g., a CompactFlash card, a Memory Stick, SmartMedia card, MultiMediaCard (MMC), SD (Secure Digital) memory, etc.), or any other memory storage that exists currently or will exist in the future. The storage module 66 may store applications that may be run on the portable electronic device 16. For example, some applications may include one or more image capture applications, one or more scanning applications, and other detection (e.g., visual detection) applications that are configured to detect symbology. As described with respect to FIG. 5, these applications may be managed by the symbology management module 80.

The transmission module 68 enables the portable electronic device 16 to transmit or transfer information to other computing devices and to receive information from other computing devices, e.g., digital media files, codes to unlock downloaded media, encryption/decryption keys, etc. The transmission module 68 may perform its functionality by hardwired and/or wireless connectivity. The hardwire connection may include but is not limited to hard wire cabling, e.g., parallel or serial cables, USB cable, Firewire (1394 connectivity) cables, etc., and the appropriate ports. Wireless connections may operate under any various wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed in the future for wirelessly transmitting data. The transmission module 68 may compress and encode the encrypted information for transmission using any suitable wireless communication technology. In one embodiment, antenna ANT is coupled to the transmission module 68 for extending the wireless transmission range of the portable electronic device 16.

The capture module 72 may be associated with the image capture device 58 to capture an image desired by the user in digital form, e.g., an image of a product, a barcode, etc. The capture module 72 may include an image sensor, an analog-to-digital (A/D) converter and a digital signal processor (DSP). Referring to FIG. 2B, when a user desires to capture an image, a lens of the image capture device 56 may be aimed at a subject of the image and is used in conjunction with display module 62 for positioning a subject of the image in lieu of a viewfinder. Light is allowed to enter through the lens and shine on the image sensor, e.g., a charge-coupled device (CCD) or complimentary metal-oxide semiconductor (CMOS). The capture module 72 may include millions of photo-sensors, e.g., pixels, wherein each pixel absorbs the light and transforms the light into an electric charge proportional to the intensity of light. Each charge is transmitted to an A/D converter where the charge is converted into a digital value representing the color the pixel will be, e.g., representing different intensities of red, green and blue. The digital values are then passed to the digital signal processor which enhances the image, compresses it and then stores it in a digital file format in the storage module 66.

In other embodiments, the portable electronic device 16 further includes a scanning module 74 for scanning symbology (e.g., a barcode) on an object or product. The scanning module 74 in conjunction with the scanning device 56 may contain a light source, e.g., LED, and a photocell coupled to the computer processing module 70, or alternatively, includes a separate decoder engine that decodes the data received by the photocell before sending it to the computer processing module 70. Knowledge of the art reveals that many different types of scanners currently exist and the inventor realizes that the type of scanner would depend upon the type of symbology that is utilized for the particular objects. The symbology may be in any form currently practiced in the art including barcodes (e.g., UPC, EAN, PDF417, etc.), photosymbols, standard or specialized text, etc., or any future type of symbology.

It is to be appreciated that the capture module 72 may also be used in conjunction with the scanning module 74 to read symbology associated with an object or product. Here, the capture module 72 acquires an image of the symbology and the scanning module 74 may further include a digital signal processor executing an algorithm for deciphering or decoding the symbology from the captured image. The use of an image sensor to read symbology, e.g., a barcode, is known in the art and systems employing such technology are commercially available from Symbol Technologies of New York. The portable electronic device 16 may also include other visual detection modules 76, such as additional cameras, additional scanners, video cameras, infrared sensors, etc. In some embodiments, the other visual detection devices 76 may include sensors that sense light outside the visual spectrum, e.g., RF sensors, etc.

The symbology management module 80 is configured to obtain data from any suitable visual detection system incorporated in the portable electronic device 16. If the portable electronic device 16 includes an image capture system containing an image capture device and image capture software applications, the symbology management module 80 may be configured to recognize symbology within the captured image. If the portable electronic device 16 includes a scanning system containing a scanning device and scanning software applications, the symbology management module 80 may be configured to detect symbology of the scanned object. Other visual detection systems contained in the portable electronic device 16 may be configured to visually detect symbology, which may be processed by the symbology management module 80. A description of the symbology management module 80 with respect to symbology detection applications is provided below with respect to FIG. 5.

The portable electronic device 16 may also include an encryption module 82. The encryption module 82 may be configured to use conventional code encryption algorithms currently in use or that will be in use in the future such as symmetric-key algorithms, e.g., DES, Triple-DES, Blowfish, RC2, RC4, RC5, etc., and asymmetric-key algorithms, e.g., Diffie-Hellman, RSA, ElGamal, etc., to decrypt locked digital media content files that are stored in the storage module 66. The encryption module 82 may also encrypt user information before it is transmitted to another device or server.

In one embodiment, the portable electronic device 16 according to the principles of the present disclosure may be embodied as a mobile phone including the modules and architecture illustrated in FIGS. 2 and 3. In this embodiment, microphone 54 is further coupled to the communication module 78 for encoding a user's speech to be transmitted via antenna ANT using CDMA, PCS, GSM or any other known wireless communication technology. The user may enter phone numbers to be dialed via the touch screen, or alternatively, as is known in the mobile phone art, the input means 48 of the portable electronic device 16 may include a full QWERTY keyboard as an input module to enter text information. In addition to producing audio from audio or multimedia content, speaker 44 may be coupled to the antenna ANT and a decoder for receiving and decoding voice communication from another mobile phone.

It is to be appreciated that the communication module 78 may include a single integrated circuit chip to perform data transfer and voice communications or a single module including a separate data transfer chip, e.g., a WiFi transceiver, and a separate voice communication chip, e.g., a CDMA chip. In one embodiment, the communication module 78 operates on the wireless GPRS (General Packet Radio Service) data protocol, a 3G protocol such as W-CDMA, CDMA2000 and TD-SCDMA, a 4G protocol or other ultra-broadband access protocol LTE Advanced standards for the 3GPP family, IEEE 802.16m standard (i.e., WiMAX), etc. The GPRS, 3G, and 4G protocols have the ability to carry both voice and data over the same service.

It is to be appreciated that the portable electronic device 16 described above is an exemplary device and may include all or a portion of the modules described above. Furthermore, it is to be appreciated that various types of portable electronic devices (e.g., mobile phones, personal digital assistant (PDA), digital media playback device, etc.) may be used in accordance with the principles of the systems and methods of the present disclosure described herein.

Figure 4:
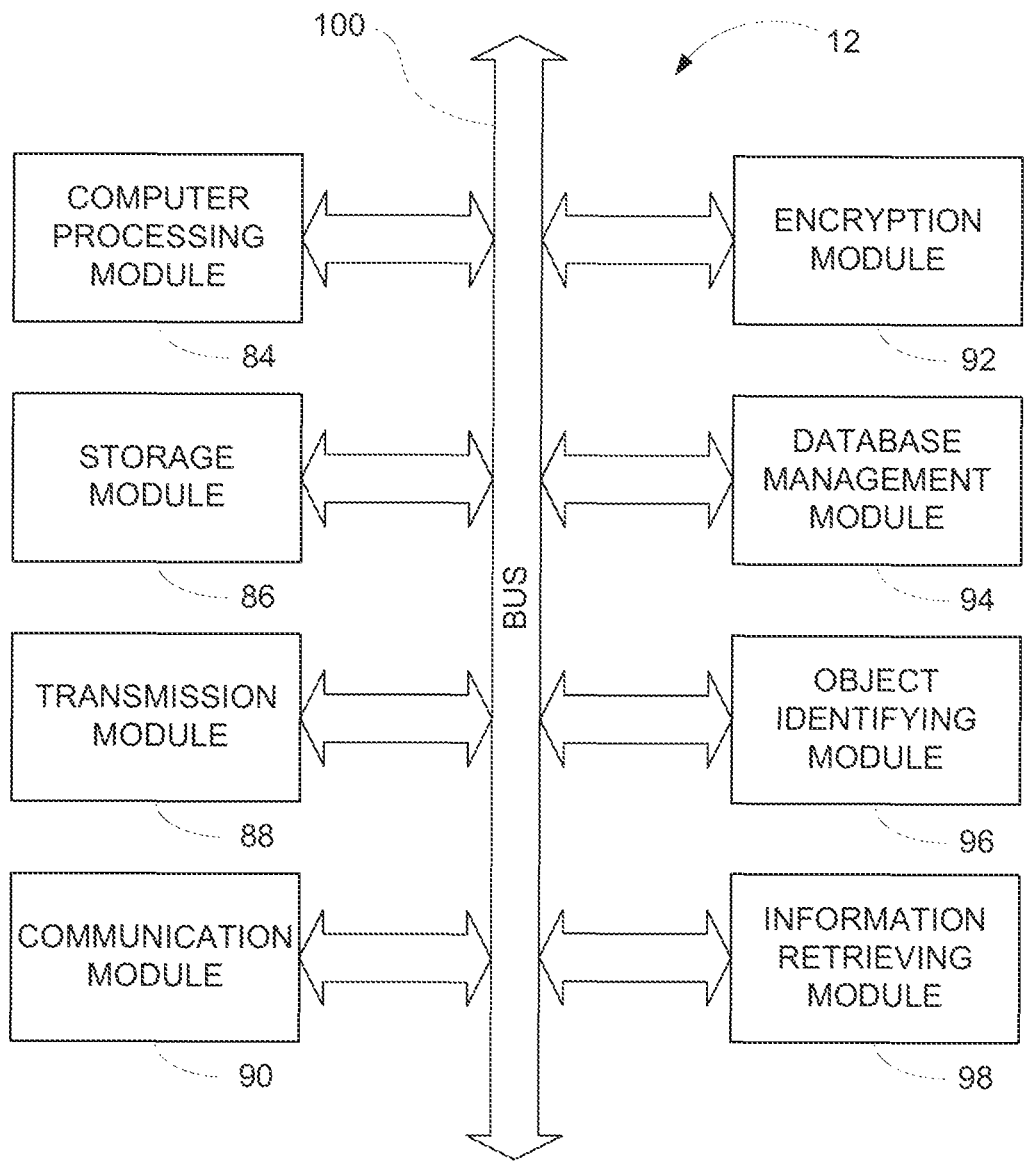
FIG. 4 is a block diagram of various modules included in the server illustrated in FIG. 1, according to various embodiments of the present disclosure.

FIG. 4 is a block diagram illustrating an embodiment of various modules associated with the server 12 shown in FIG. 1. In this embodiment, the server 12 includes a computer processing module 84, a storage module 86, a transmission module 88, a communication module 90, an encryption module 92, a database management module 94, an object identifying module 96, and an information retrieving module 98, each interconnected via a bus 100.

The computer processing module 84 (e.g., a microprocessor) may use computer software instructions and conventional computer processing power to interact and organize the traffic flow between the various other modules. It is to be understood that the modules of the server 12 may be implemented in various forms of hardware, software, firmware, special purpose processors, or a combination thereof. The computer processing module 70 may further include, in addition to a microprocessor, a digital signal processor (DSP), which may include several known decompression algorithms for decompressing stored media content, e.g., a MP3 file. The server 12 of the present disclosure may be configured to support various file types, such as those used by the portable electronic device 16 or other devices of the system 10.

The storage module 86 may include internal storage memory (e.g., RAM), non-volatile memory (e.g., ROM), removable memory (e.g., magnetic storage memory), optical storage memory (e.g., various types of CD and DVD media), solid-state storage memory (e.g., a CompactFlash, Memory Stick, SmartMedia, MMC, SD memory, etc.), or any other memory storage that exists currently or will exist in the future.

The transmission module 88 enables the server 12 to transmit or transfer information to other computing devices and to receive information from other computing devices, e.g., digital media files, codes to unlock downloaded media, encryption/decryption keys, etc. The transmission module 88 may perform its functionality by hardwired and/or wireless connectivity.

The communication module 90 may include a single integrated circuit chip to perform data transfer and voice communications or a single module including a separate data transfer chip and a separate voice communication chip. In some embodiments, the communication module 90 may operate on the wireless GPRS data protocol, a 3G protocol, a 4G protocol, or other protocol having the ability to carry both voice and data over the same service.

The encryption module 92 may be configured to use conventional code encryption algorithms currently in use or that will be in use in the future, such as symmetric-key algorithms and asymmetric-key algorithms to decrypt locked digital media content files that are stored in the storage module 86. The encryption module 92 may also encrypt user information transmitted from a user device or other server.

The database management module 94 may be configured to manage the contents of the storage medium 14. Particularly, the database management module 94 may retrieve data from storage medium 14 or other databases related to information about a variety of objects. In response to an information request from a user device (e.g., portable electronic device 16), the server 12 may utilize the database management module 94 to fulfill the information request by retrieving information about the specific object or objects. This information may then be transmitted to the user device.

The object identifying module 96 is configured to receive symbology or a decode string from decoded symbology. When this is received, the object identifying module 96 is configured to identify the object or objects that are associated with the symbology or decode string. The object identifying module 96 may be configured to utilize the database management module 94 to lookup information in a database (e.g., storage medium 14) that contains the relationships between objects (e.g., products) and corresponding symbology or character strings that may be obtained by decoding the symbology.

After the object of interest is identified by the object identifying module 96, the information retrieving module 98 is configured to retrieve information about the specific object or objects. The information retrieving module 98 may also utilize the database management module 94 to retrieve information from one or more databases. The information retrieving module 98 may access various resources available via the communication network 26 to obtain the needed information pertaining to the object or objects.

Figure 5:
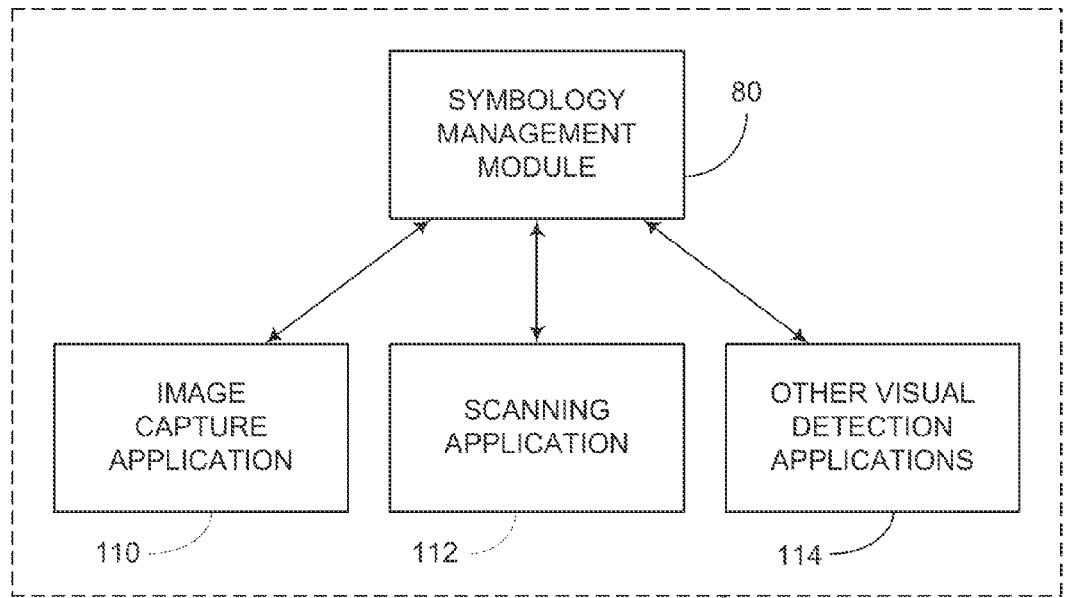
FIG. 5 is a block diagram of various modules included in the symbology management module illustrated in FIG. 3, according to various embodiments of the present disclosure.

FIG. 5 is a block diagram of an embodiment of a portion of the storage module 66 shown in FIG. 3. For example, several applications may be stored in the storage module 66, including, among others, the symbology management module 80 shown in FIG. 3, an image capture application 110, a scanning application 112, and other visual detection applications 114. According to some embodiments, the other visual detection applications 114 may include detection applications that detect in a way other than visually.

The image capture application 110 may be configured to operate with an image capture device (e.g., camera). In some embodiments, the image capture application 110 may run in the background while other applications are running on the portable electronic device 16. While running in the background, the image capture application 110 may be configured to automatically search for recognizable symbology. For example, the image capture application 110 may be configured to search for bar codes. The symbology management module 80 may control these operations such that when symbology is detected automatically, the symbology management module 80 may prompt the user to determine if he or she wishes that the portable electronic device 16 proceeds with the decoding of the symbology and retrieving information about an object associated with the symbology.

According to various implementations, the image capture application 110 may be configured to respond to a user's prompt or trigger to capture a single image. The symbology management module 80 may be configured in the case of this typical image capture process to automatically search for and decode any symbology that may exist in the captured image. Again, the symbology management module 80 may prompt the user as to whether he or she wishes to pursue the decoding of the symbology, if it exists, and retrieving information about an object associated with the symbology.

The scanning application 112 may operate in a way that is similar to that of the image capture application 110 except that the scanning application 112 responds to images obtained by a scanning procedure instead of an image capture procedure. The symbology management module 80 may continue analyzing scanned data to determine if symbology is detected, either during a user-initiated trigger or when detected automatically while the scanning application 112 is running in the background. The symbology management module 80 may also operate in a similar way with respect to the other visual detection applications 114 based at least on the particular formats, protocols, functions, etc. of the other types of detection devices, which may be incorporated in the portable electronic device 16 and which may be capable of sensing any type of symbology.

Figure 6:
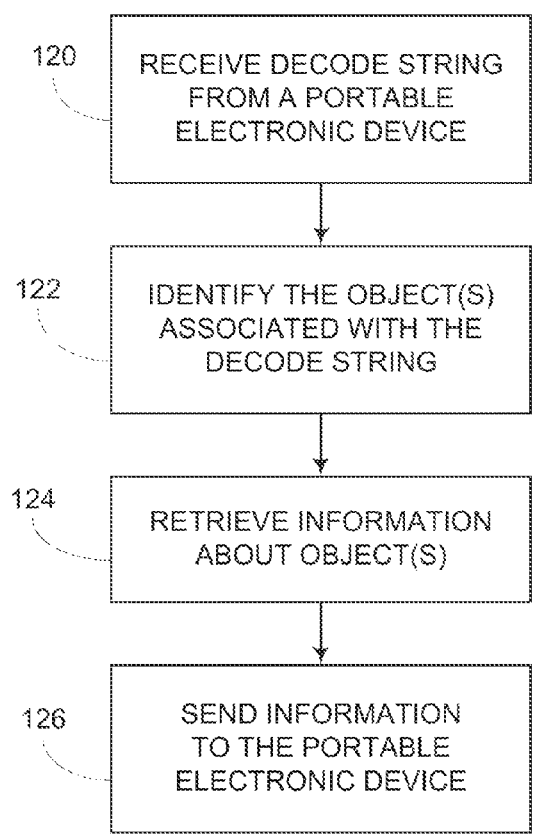
FIG. 6 is a flow diagram illustrating a method of a server for retrieving information about an object.

FIG. 6 is a flow diagram showing an embodiment of a method that may be performed by a server, such as the server 12 described with respect to FIGS. 1 and 4. The method includes receiving a decode string from a portable electronic device (e.g., device 16), as indicated in block 120. In some embodiments, the method may include receiving encoded symbology information and then decoding this information to obtain the decode string. As indicated in block 122, the method includes identifying the object or objects associated with the decode string. For example, the object may be an article or commerce. From the identity of the object(s), the method includes retrieving information about the object(s), as indicated in block 124. For example, information about various objects may be obtained from any database or resource available. When the information has been retrieved, the information is sent to the portable electronic device (block 126).

Figure 7A:
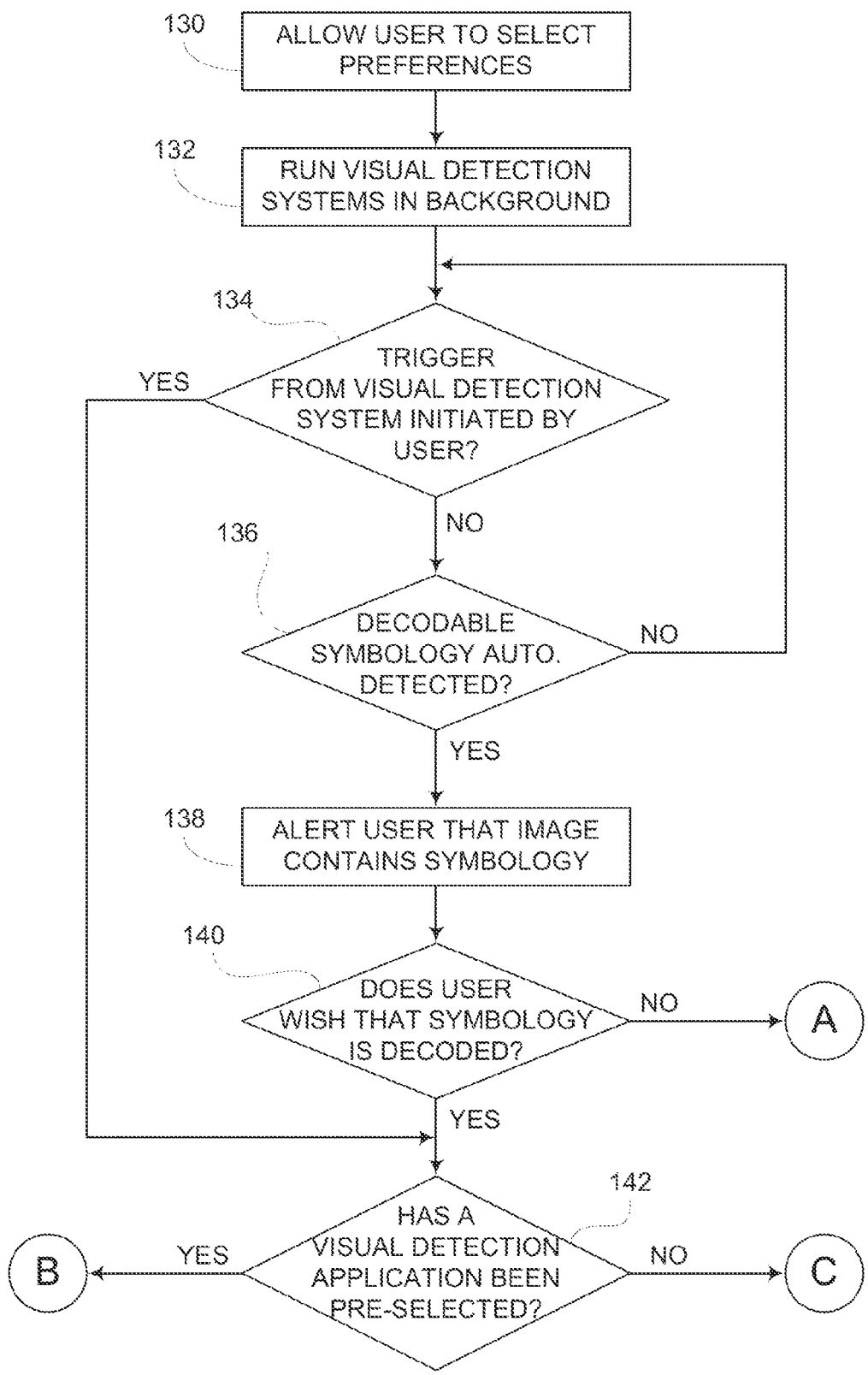
FIGS. 7A through 7C collectively illustrate a flow diagram of a method of a portable electronic device for presenting information of an object, according to various embodiments of the present disclosure.
Figure 7B:
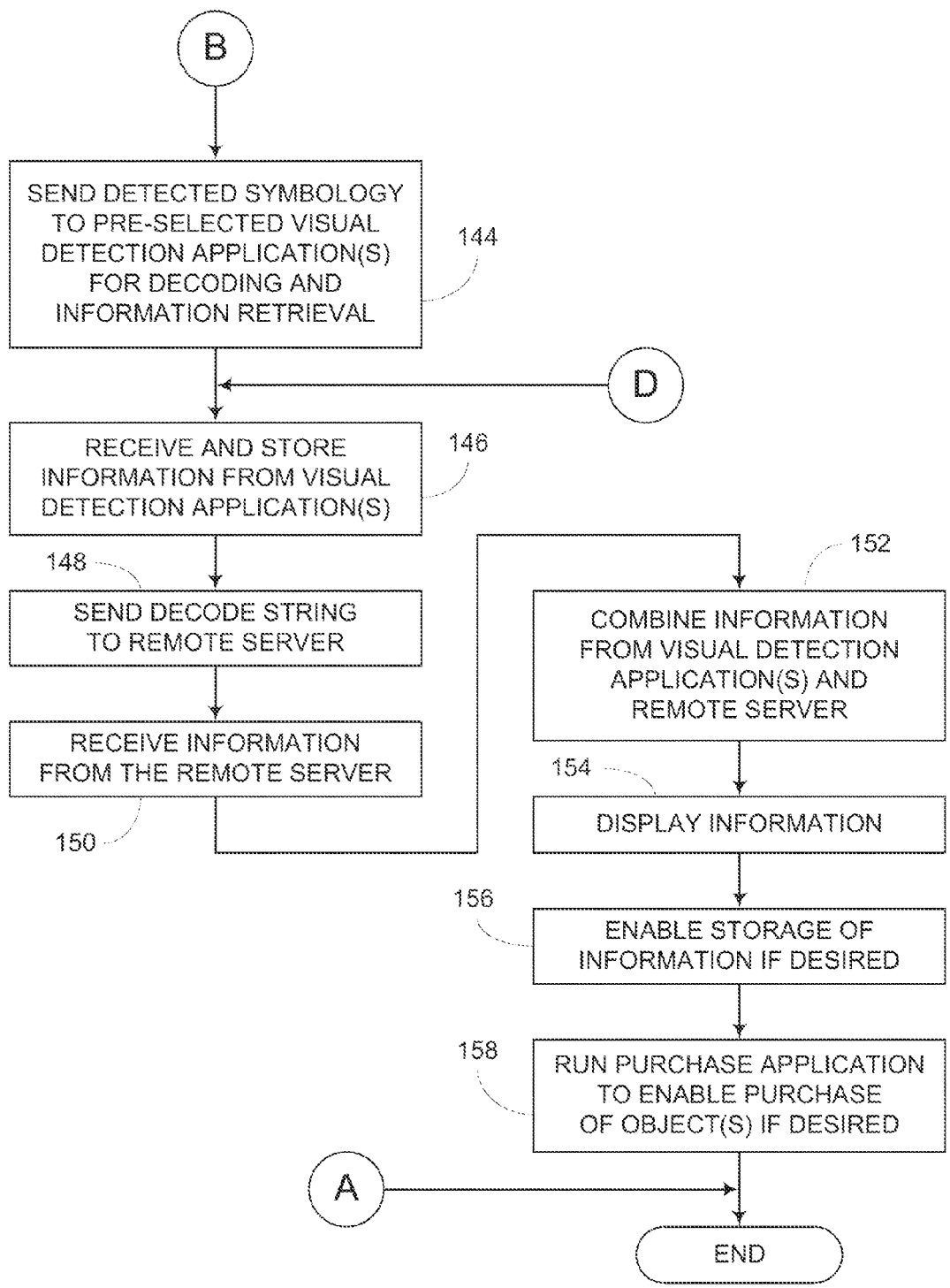
Figure 7C:
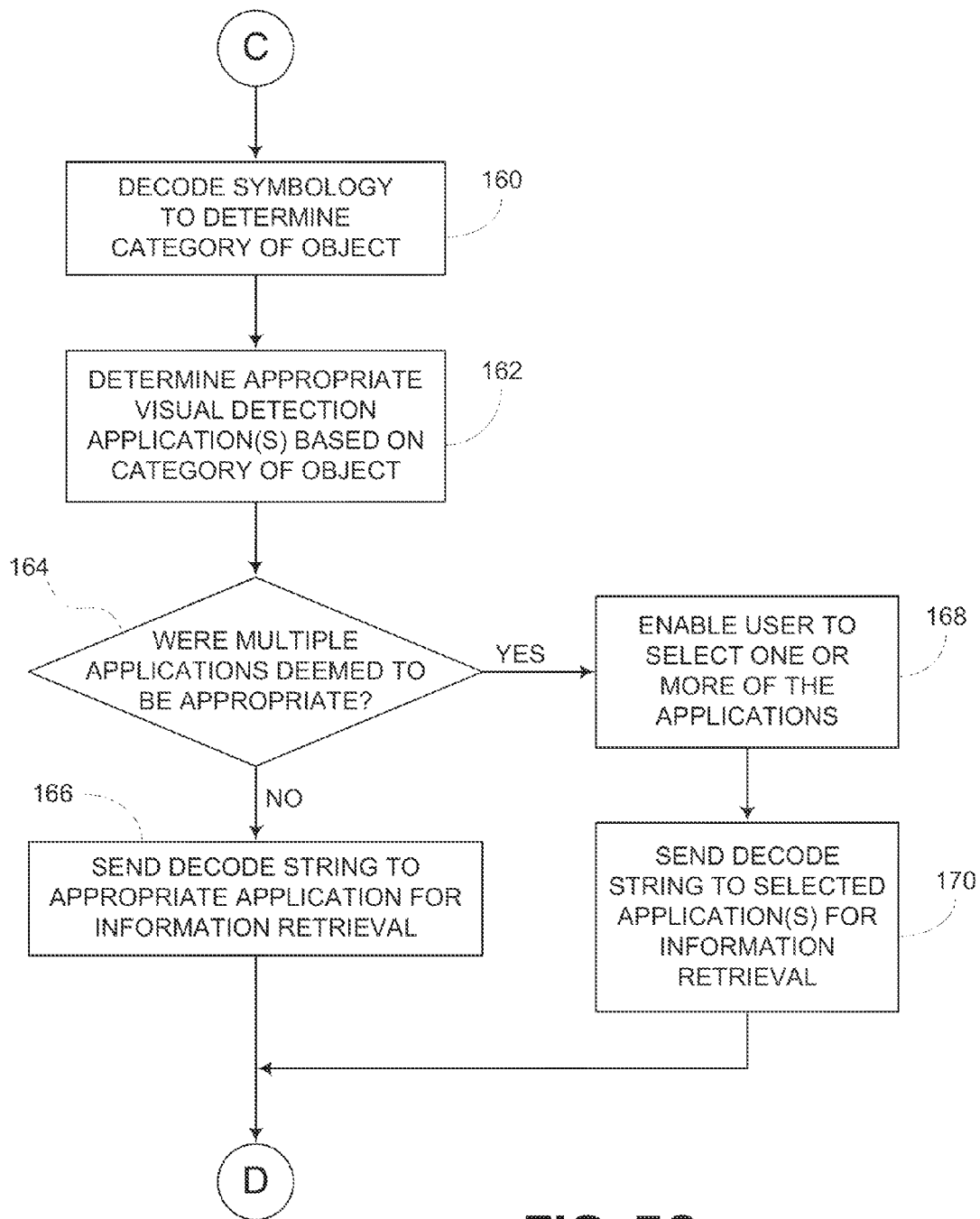

FIGS. 7A, 7B, and 7C collectively form a flow diagram showing an embodiment of a method that may be performed by a portable electronic device, such as the portable electronic device 16 described with respect to FIGS. 1-3 and 5. In this embodiment, the method includes allowing a user to select preferences as indicated in block 130. Default presets may initially be provided, but the user may choose to select other preferences at any time as needed. As indicated in block 132, one or more visual detection systems are run in the background of the device, where other programs or systems are given priority with respect to processing steps over the one or more visual detection systems, unless of course one of the visual detection systems is currently being used. The background systems may include image capture systems (e.g., camera systems), scanning systems, or other detection systems capable of detecting symbology.

In decision block 134, the method includes determining whether a trigger from a visual detection system is initiated by the user. For example, if a detection system is already running, the user may initiate an image capture, scan, or other input operation (e.g., by pressing a button to take a picture with a camera on the portable electronic device). If the system does not receive a trigger, the method proceeds to decision block 136, which determines whether or not decodable symbology is automatically detected. In some embodiments, the automatic detection of decodable symbology may involve detection by any visual detection system running in the background. If no user-initiated trigger is detected in block 134 and no decodable symbology is detected in block 136, the method loops back to decision block 134 until an applicable image is detected.

If a background application detects decodable symbology according to decision block 136, the method proceeds to block 138. In block 138, the user is alerted that an automatically detected image contains some type of symbology.

As indicated in decision block 140, it is determined whether or not the user wishes that the symbology is decoded. If not, the method skips the remaining steps and comes to an end. If symbology is to be decoded, the method goes to decision block 142, which indicates that it is determined whether or not a visual detection application has been pre-selected. If so, the method proceeds to block 144 (FIG. 7B). Otherwise, the method goes to block 160 (FIG. 7C).

As indicated by block 144, shown in FIG. 7B, the detected symbology is sent to one or more pre-selected visual detection applications for decoding and information retrieval. The pre-selected visual detection applications may have been selected based on the selected preferences made with respect to block 130. The visual detection applications and/or related decoding software may be configured to decode the detected symbology to obtain a decode string. Also, the applications may be configured to obtain information about one or more objects associated with the decode string decoded from the detected symbology. As indicated in block 146, the method includes receiving and storing information from the visual detection application(s).

According to block 148, the decode string is also sent to a remote server (e.g., server 12). Later, the method receives information from the remote server as indicated in block 150. The information from the server may be related to information about one or more objects identifiable by the decode string. As indicated in block 152, the information from the visual detection application(s) is combined with information from the remote server according to various implementations. At this point, the method includes displaying the information on a display screen of the portable electronic device.

While or after the information is displayed, the method also includes enabling the user to store the information if desired, as defined in block 156. In addition, the user is given an option to run a purchasing application to enable the purchase of the object or objects if desired. This may also be performed while or after the information is displayed. Therefore, one advantage of displaying information for the user is to provide appropriate data to inform the user of objects (e.g., products) that the user may consider purchasing. With the information, the user may be able to make a more informed purchasing decision. After the information is displayed and stored (if desired) and one or more objects are purchased (if desired), the method comes to an end.

When visual detection applications have not been pre-selected by the user, as determined in decision block 142, the method jumps ahead to block 160 as shown in FIG. 7C. In block 160, the symbology is decoded to determine a category of the object. As indicated in block 162, the method includes determining the appropriate visual detection application(s) based on the object's category. According to decision block 164, it is determined whether or not multiple applications were deemed to be appropriate. If not, the method goes to block 166, which indicates that the decode string is sent to the one appropriate application for retrieving the information. If it is determined in decision block 164 that multiple applications are appropriate, the method goes to block 168. As indicated in block 168, the user is enabled to select one or more of the applications. In block 170, the decode string is sent to the selected application(s) for information retrieval. After the decode strings are sent off for information retrieval according to blocks 166 and 170, the method returns to block 146, which involves receiving and storing the information from the visual detection application(s) and the following processes as discussed above.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A system, comprising:
a portable electronic device configured to:
scan an object, wherein the object contains a Radio Frequency Identification Tag (RFID);
detect an image associated with an object using one or more detection applications;
decode the image to obtain a decode string using the one or more detection applications; and
send the decode string to a remote server for processing;
the remote server configured to process the decode string and determine information with regard to the object based on the decode string;
wherein the portable electronic device is further configured to:
receive the information with regard to the object based on the decode string from the remote server;
and display the information on a display device associated with the portable electronic device.

2. The system of claim 1 wherein the one or more detection applications comprises at least one viewfinder.

3. The system of claim 1, wherein the object is associated with a unique identification code.

4. The system of claim 1, wherein the display further comprises an audio output device.

5. The system of claim 1, wherein the portable electronic device further comprises a storage module.

6. The system of claim 1, wherein the portable electronic device is further configured to encrypt information before it is transmitted to another portable electronic device or the remote server.

7. The system of claim 1, wherein the portable electronic device is further configured to decrypt one or more locked digital media content files stored in the storage module.

* * * * *